Figure 1:
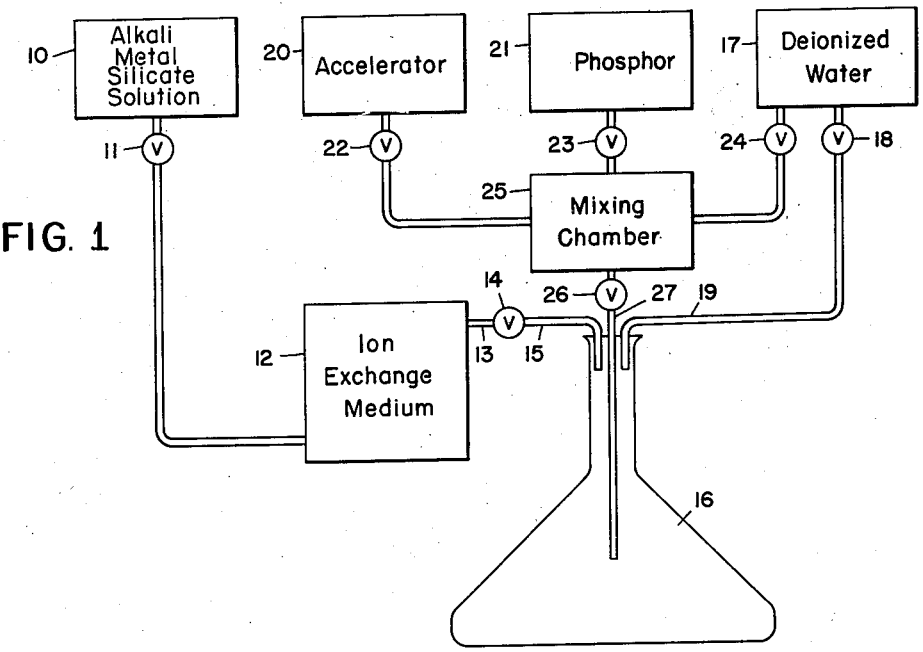

FRANK J. KINSCH
NATHAN D. LEVIN
INVENTORS.

THEIR ATTORNEY

United States Patent Office 2,828,217
Patented Mar. 25, 1958

2,828,217

LUMINESCENT SCREEN FORMING PROCESS

Nathan D. Levin, Schiller Park, and Frank J. Kinsch, Evanston, Ill., assignors to The Rauland Corporation, a corporation of Illinois Application April 29, 1955, Serial No. 504,956

16 Claims. (Cl. 117—33.5)

This invention relates to cathode-ray tubes such as those employed as image-reproducing devices in television receivers and the like. More particularly, the invention relates to a new and improved method for forming the luminescent screen of a cathode-ray tube.

The art of forming a luminescent screen on a solid substrate such as the faceplate of a cathode-ray tube envelope is highly complex and of long standing. Some of the more primitive approaches of the art have involved applying to the substrate adhesive substances on which the phosphor material is dusted, painting the substrate with a suspension of phosphor material in an appropriate binder, or spraying the phosphor-coated substrate with a solution of waterglass to bind the phosphor to the screen support. In the early stages of the art, these techniques were quite satisfactory in view of the severe performance limitations imposed by the relatively poorly developed state of the art at that time.

For a number of years now, the predominant methods of forming luminescent screens on the faceplates of cathode-ray tube envelopes have involved the settling of the phosphor material through a fluid column. At first the phosphor was dumped in a dry state into a column of plain water previously introduced into the picture tube bulb and the bulb was maintained stationary to permit the powder to settle through the water onto the faceplate. It was soon discovered that the phosphor particles acquired troublesome electric charges while settling through a column of plain water, and that these charges led to uneven distribution of the powder in the finished screen. To overcome this difficulty, the art progressed to the use of inorganic salts or weak acids in the settling liquid to serve as an electrolyte and preclude the acquisition of undesired electric charges.

When a phosphor is settled through a column of plain water or a simple aqueous solution of an electrolyte, it is necessary to permit the envelope to stand for a prolonged period of time in order to achieve a uniform screen distribution. Moreover, when settling through a liquid of this type, the relatively small Van Der Waal forces must be relied upon to bind the phosphor particles to the screen support. Consequently, considerable care must be exercised in removing the settling liquid after the phosphor has been deposited on the screen surface. In practice it has been found virtually necessary to employ siphoning techniques to drain off the settling liquid, although it may be possible to obtain occasional satisfactory screens by careful decantation practices.

In view of the desirability of increasing the adherence of the phosphor to the screen substrate for the purpose of avoiding the tendency toward avalanching on decantation, the art has evolved practices and techniques which retain the uniform distribution characteristic of settling processes while providing a phosphor adherence comparable with that achieved through the older spraying and dusting techniques. To this end, it is common practice to incorporate sodium or potassium waterglass in the settling liquid in suitable quantities for the purpose of providing a noticeable improvement in the resistance of the screen to avalanching on decantation and in the ultimate dry adherence of the phosphor to the faceplate.

In a modification of the silicate settling process, the settling liquid is altered in such a way as to accelerate the settling time; this is accomplished by combining the electrolyte additives previously employed to dissipate undesired electrical charges with the aqueous silicate solution employed to improve phosphor adherence. In this modified process the settling liquid takes the form of a colloidal suspension which in its ultimate development tends to become a gel; for this reason, the process has been colloquially although erroneously referred to as a "gel settling" process.

Satisfactory screens may be obtained with the "gel settling" process in sufficiently short time intervals to be commercially practicable. However, it has always been characteristic of screen settling processes in general and of "gel settling" in particular, that the most stringent control must be maintained over all aspects of the process. Inadvertent impurities in the water of even very minute proportions may lead to defective screens and small variations in silicate and electrolyte concentrations often lead to significant variations in screen adherence. In some instances, the defects may be so latent that they show up only after prolonged time intervals of the order of weeks or months from completion of the manufacturing and testing operations. This has been particularly characteristic of screens composed of the silica-coated or silicized phosphor powders currently employed in the industry for the purpose of achieving increased cross-burn resistance; unless extremely critical control is maintained over the purity and concentrations of the various constituents of the settling liquid and over the baking and pumping cycles in subsequent operations, it has been found that even screens considered exceptionally good at the time of final testing may flake off and become utterly unusable upon prolonged shelf life or in actual use. Needless to say, such critical control over production activities is exceedingly difficult to maintain.

Accordingly, it is an object of the present invention to provide a new and improved luminescent screen forming process which avoids one or more of the disadvantages of prior art processes.

It is a more particular object of the invention to provide a new and improved settling process for forming a luminescent screen on the faceplate of a cathode-ray tube envelope.

Another object of the invention is to provide a luminescent screen settling process which is not so critical in nature as the prior art "gel settling" process yet provides improved adherence of the phosphor to the faceplate.

A corollary object of the invention is to provide an improved screen settling process which retains the advantage of short settling time at no increase in cost yet permits the use of silica-coated phosphors for improved cross-burn resistance without sacrifice in screen adherence.

A further object of the invention is to provide a novel process for forming a luminescent screen on the faceplate of a cathode-ray tube envelope which is characterized by all of the advantages individually attributable to prior art processes but without any of the attendant disadvantages.

These and other objects of the invention are achieved by employing as the settling liquid a colloidal suspension of silicic acid and at least one accelerator or electrolyte in a neutral solvent such as water, as distinguished from the sodium or potassium silicate solutions employed in previous settling processes. Preferably, the settling liquid contains no positive ions except those which are fully volatilizable either during settling or during subsequent baking operations; organic and inorganic ammonium salts (other than the halides), organic and inorganic acids, and certain organic compounds such as the alcohols and ketones have been found eminently suitable for this purpose. Nevertheless, marked improvement in screen adherence along with definite improvements in the other characteristics of the finished tube have been observed when additives imparting non-volatilizable positive ions to the settling liquid have been employed. In addition to improving the screen adherence and providing considerably increased flexibility of production control, the process of the invention has been found to provide definite improvement in the appearance of the finished screen, both in an inactive state and under electron bombardment, and in the susceptibility of the tube to outgassing during the evacuating operation, with a consequent improvement in tube life.

Figure 2:
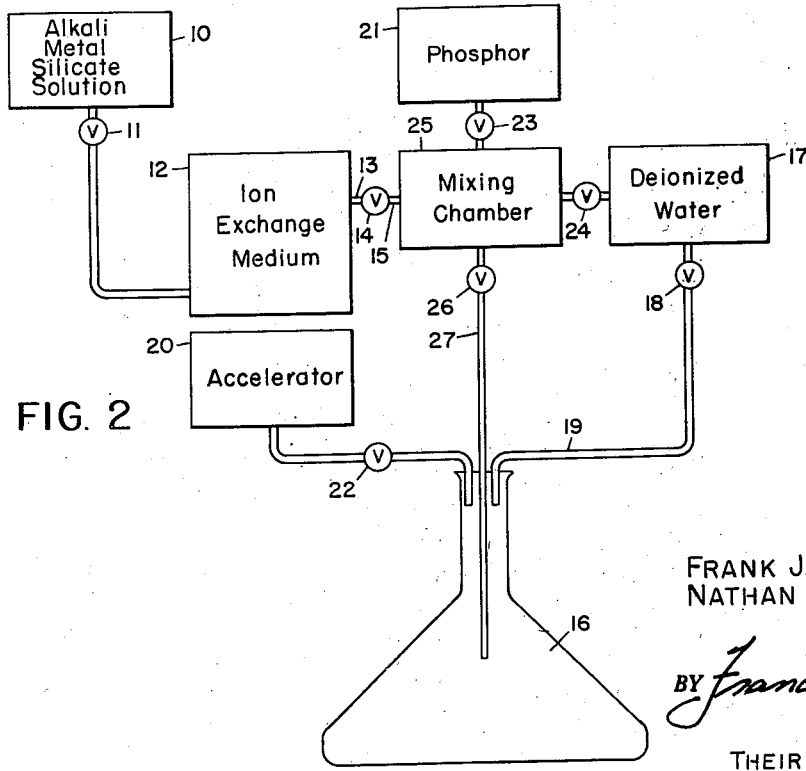

The features of the invention which are believed to be novel are set forth with particularity in the appended claims. The organization and manner of operation of the invention, together with further objects and advantages thereof, may best be understood by reference to the following description taken in conjunction with the accompanying drawing, in which:

Figure 1 is a schematic representation of suitable apparatus for carrying out the process of the present invention; and Figure 2 is a similar schematic diagram of apparatus for performing the process of the invention in a preferred embodiment.

In all embodiments of the invention, the phosphor material is settled through a fluid column consisting essentially of colloidal silica, one or more accelerators or electrolytes, and a neutral solvent such as water. For convenience, the colloidal suspension of silicic acid and water may be introduced into the tube envelope first and the phosphor may be added in the form of a suspension or slurry in an aqueous solution of the accelerating agents. However, the sequence in which the ingredients of the settling liquid are introduced into the envelope is extremely flexible and may be varied to suit the convenience of the manufacturer in making optimum use of plant facilities. The techniques employed in introducing the settling liquid and the phosphor into the envelope and decanting the excess settling liquid after deposition of the phosphor on the screen, together with all subsequent steps in the manufacturing process including aluminizing, baking, evacuating and testing, may be fully conventional requiring no change in either the equipment or the manufacturing procedures employed in present day cathode-ray tube fabricating plants. The benefits of the invention may be realized by merely modifying the composition of the settling medium, although the invention may best be exploited to full commercial advantage by installing a certain amount of additional equipment, as hereinafter explained.

The colloidal silica may best be prepared by an ion exchange process, of which several are well known in the art. Specifically, an aqueous solution of sodium or potassium silicate may be passed through a column of cation exchange resin such as sulfonated polystyrene. A certain amount of experimentation may be required to determine the optimum concentration of the initial potassium or sodium silicate solution, although a solution of one part of potassium silicate, having a 3.9:1 mol ratio of silica to potassium oxide and a solids content of about 28%, to three parts of water has been found quite satisfactory; in any event, the silicate concentration is not particularly critical and may be varied within rather wide limits without adversely affecting the results obtained. While this method of preparing the colloidal suspension of silicic acid for use in the settling process of the present invention is preferred, it is nevertheless possible to employ colloidal silica prepared in any other manner if desired.

The accelerating agents or electrolytes which are suitable for use in the process of the invention may be classified into two different categories. The first or preferred group consists of organic and inorganic salts, acids, and bases containing only volatile or fully volatilizable positive ions. In this group are the inorganic ammonium salts such as ammonium nitrate, ammonium sulfate, ammonium phosphate, ammonium monohydrogen phosphate, ammonium dihydrogen phosphate, and ammonium carbonate. Other ammonium salts which exhibit properties of both organic and inorganic compounds, such as ammonium acetate and ammonium formate may also be employed with advantage. Organic salts containing only fully volatilizable positive ions include ethyl amine nitrate, tetra-methyl ammonium nitrate, tri-methyl amine nitrate and morpholene. Suitable acids include phosphoric acid, acetic acid and formic acid, and ammonium hydroxide is typical of the bases containing only volatilizable positive ions. The alcohols and ketones, especially acetone, are also included in the preferred group of accelerators. The use of these preferred accelerators, together with silicic acid and water as basic constituents, provides a settling fluid consisting of a colloidal suspension of substantially pure silicic acid.

In the second group, which may be employed as accelerating agents to achieve most of the advantages of the invention, are the organic and inorganic salts and bases containing positive ions which, although not volatilizable, are fully compatible with the cathode materials and other active compositions employed in the manufacture of picture tubes. In this group are the alkali metal salts including the phosphates, nitrates and acetates of the alkali metals such as sodium and potassium. Inorganic salts of the alkaline earth metals, such as barium nitrate and barium acetate, may also be employed. Beneficial results have also been achieved with the oxides of magnesium and aluminum and with calcium metaborate. With accelerators of this group, the settling liquid consists of a colloidal suspension of silicic acid with certain impurities, but these impurities are compatible with the various components of the finished tube and the materials used in processing.

The accelerating agents or electrolytes may be employed singly or in any of a multitude of combinations as desired. However, care must be taken to avoid using materials such as the halides or other materials which may directly or indirectly lead to poisoning of the active cathode material in subsequent operation of the tube, or materials containing constituents which may be incompatible in other respects with the finished product.

The water employed in the settling process of the invention should be deionized or distilled in accordance with conventional practices in the industry.

A more complete appreciation of the process of the invention and the advantages achieved thereby may perhaps be most readily achieved by considering several representative examples of specific settling procedures which have been successfully employed. These examples are set forth only by way of illustration and in no sense by way of limitation.

Example 1

An aqueous colloidal silica suspension comprising a silica content of 5.6 grams per 100 ml. of solution and having a specific gravity of 1.027 is eminently suitable for the process of the invention and accordingly may be considered a "standard" suspension. This standard suspension may most conveniently be prepared by subjecting 250 ml. of a 28% aqueous solution of potassium silicate, diluted with 750 ml. of water, to an ion exchange process; the colloidal silica suspension thus formed is substantially pure silicic acid as distinguished from the previously employed silicate solutions which contain additional ingredients in significant amounts. 1000 ml. of the standard colloidal silica suspension and 6250 ml.

of deionized or distilled water are introduced into a 17-inch rectangular cathode-ray tube envelope to be processed.

A phosphor suspension or slurry is prepared by suspending 4.5 grams of 1.5%-silicized zinc-cadmium sulfide phosphor (type P4), together with 37.8 grams of ammonium acetate, 17.5 ml. of 44 Normal phosphoric acid and 28.5 ml. of 15 Normal ammonium hydroxide, in 750 ml. of water. The resulting slurry is sprayed or otherwise uniformly distributed over the surface of the silicic acid solution in the tube envelope to provide a fluid column consisting essentially of a colloidal silica suspension and three accelerating agents in water. Almost immediately upon introduction of the phosphor slurry into the envelope, polymerization of the colloidal silica particles at a greatly accelerated rate commences. The polymerization is readily observable and manifests itself as a general clouding of the settling medium. The envelope is maintained in a settling position with the faceplate in a substantially horizontal plane for about 20 minutes; the phosphor settles through the colloidal silica onto the faceplate in about 5 minutes, and the balance of the 20 minutes is required to permit the settled phosphor to adhere or set on the faceplate. When the hydrogen ion concentration of the residual settling fluid reaches a value of pH 7.1, the excess colloidal silica suspension is removed from the envelope, preferably by decantation at a rate not exceeding 2.5 minutes for 150° tilt to complete pour-off. For best results in all variants of the process, the hydrogen ion concentration at pour-off should be in the range from pH 6 to pH 8, although satisfactory screens may be settled with suspensions outside the optimum range.

The settled screen is then air-dried for about 10 minutes with a gentle air jet at a temperature of about 100° F., or may be dried in a slightly longer interval at room temperature without employing an air jet. After the usual final anode coating of colloidal graphite is applied in a conventional manner, the envelope is baked at a temperature between 350 and 400° C. for a period of 1 to 2 hours. Subsequent manufacturing procedures are completely conventional including all testing operations, assembly of the gun elements, evacuating, sealing, gettering and basing, and optional features such as an aluminum backing layer for the fluorescent screen may also be provided if desired.

The dried and baked phosphor screen prepared in accordance with the above procedure exhibits a dry adherence startlingly greater than that achieved with the most successful prior art process. To measure dry adherence, a jet of compressed air emanating from an orifice 1/16 inch in diameter was placed about 3/16 inch from the screen surface. An air pressure of 59 lbs. was required to give the first signs of dislodging phosphor particles as compared with maximum figures of 10 to 20 lbs. achieved with unsilicized phosphors in accordance with prior art practices; a figure of 5 to 10 lbs. is exceptional for screens of 1.5% silica-coated phosphors settled in accordance with prior art techniques. Moreover, to obtain even this relatively weak adherence, it is essential to subject every step of the prior art process to extremely critical and stringent control; by way of contrast, variations of as much as 2:1 in the colloidal silica concentration in the process of the invention lead to no observable change in the quality of the finished product. Moreover, the appearance of the finished screen, both in an inactive state and under electron bombardment, compares extremely favorably with the best results achieved in accordance with prior art procedures.

The settling medium employed in this example of the process contains only electrolytes or accelerators selected from the preferred group, namely those containing fully volatile positive ions. Life tests performed on the finished tubes indicates substantial improvement in tube life as compared with tubes comprising luminescent screens formed by the prior art silicate settling processes including the "gel settling" process. While the reasons for the increase in tube life are somewhat obscure, it is apparent that when sodium or potassium silicate is employed as a binder in the settling medium the oxide constituent which serves no useful purpose is left as a part of the finished screen after the baking operation has been completed. In screens formed by the process of the present invention, there are no residual extraneous substances in the finished screen, but only the phosphor itself and a substantially pure silica binder, and this apparently permits more complete outgassing during the evacuation cycle and more effective gettering than may be achieved with tubes containing a potassium or sodium oxide residue in the screen. Actual comparative life tests indicate a demonstrable improvement of as much as 300%.

*Example 2*

To screen a 17-inch television picture tube, 700 ml. of standard colloidal silica suspension and 61.8 ml. of 15 Normal ammonium hydroxide are diluted with water to a total volume of about 900 ml. 4.5 grams of 1.5% silica-coated phosphor are added to the resulting solution to form a slurry or phosphor suspension. A solution of 39.2 grams of ammonium nitrate and 35.1 ml. of 44 Normal phosphoric acid in 6250 ml. of water is introduced into the envelope, and the phosphor slurry is uniformly spread over the surface. The envelope is mounted in a settling position for a total of 20 minutes to permit the phosphor to settle through the colloidal silica and to adhere to the faceplate. Decantation is accomplished in a total time of 5 minutes, and the hydrogen ion concentration of the excess settling liquid at pour-off is pH 7.1.

*Example 3*

A solution of 780 ml. of the standard colloidal silica suspension in 6250 ml. of water is introduced into a 17-inch picture tube envelope. 4.5 grams of 1.5% silica-coated zinc-cadmium sulfide phosphor and 78.4 grams of ammonium nitrate are added to about 700 ml. of water to constitute a phosphor slurry. The slurry is buffered to a hydrogen ion concentration of pH 7.2 by adding 6.4 ml. of 3.7 Normal aqueous ammonium hydroxide. Settling is completed in a total time of 23 minutes, after which excess colloidal silica is removed from the envelope as before.

*Example 4*

78.4 grams of ammonium nitrate and 17.5 ml. of 44 Normal phosphoric acid are dissolved in 6250 ml. of water and the resulting solution is introduced into a 17-inch rectangular picture tube envelope. The phosphor slurry is prepared by suspending 4.5 grams of 0.02% silica-coated zinc-cadmium sulfide phosphor in a solution constituted of 700 ml. of the standard colloidal silica suspension and 32.5 ml. of 15 Normal ammonium hydroxide diluted with water to a total volume of 900 ml. Settling is accomplished in 20 minutes after which decantation may be achieved in 2.5 minutes; the hydrogen ion concentration at pour-off is pH 7.1.

*Example 5*

A luminescent screen is formed on a 5-inch round glass substrate by immersing the substrate in a fluid column of settling liquid consisting of 25 ml. of 0.37 Normal tetramethyl ammonium nitrate and 7 ml. of 7.8 Normal phosphoric acid in 425 ml. of water. A phosphor slurry is prepared by suspending 0.67 grams of 0.02% silica-coated zinc-cadmium sulfide phosphor in 25 ml. of the standard colloidal silica suspension buffered with 9.5 ml. of 3.7 Normal ammonium hydroxide and diluted with water to a total volume of 75 ml. Settling is accomplished in 15 minutes with a 3-minute tilt time and a hydrogen ion concentration at pour-off of pH 7.3.

*Example 6*

118 grams of ammonium nitrate and 17.5 ml. of 44 Normal phosphoric acid are dissolved in 6250 ml. of water and introduced into a 17-inch rectangular cathode-ray tube envelope. A phosphor slurry is prepared by suspending 4.5 grams of 1.5% silica-coated zinc-cadmium sulfide powder in 410 ml. of the standard colloidal silica suspension buffered with 56 ml. of 15 Normal ammonium hydroxide and diluted with water to a total volume of 850 ml. The envelope is maintained in a settling position for a total time of 20 minutes and decantation is thereafter accomplished by tilting the envelope at a uniform rate through a total angle of 150° in 2.5 minutes. The hydrogen ion concentration at pour-off is pH 9.3.

*Example 7*

To form a luminescent screen on a 5-inch round faceplate, 25 ml. of the standard coloidal silica suspension is diluted with water to a total volume of 425 ml. and introduced into the envelope. 0.67 gram of 1.5% silica-coated phosphor and 25 ml. of 2 Normal ammonium acetate are diluted with water to a total volume of 75 ml., and the resulting phosphor slurry is uniformly spread over the surface of the colloidal silica suspension. Settling is accomplished in 15 minutes, and the hydrogen ion concentration at pour-off is pH 6.4.

*Example 8*

7 ml. of 7.8 Normal phosphoric acid and 17.5 ml. of 2 Normal ammonium nitrate are diluted with water to a total volume of 425 ml. and introduced into a 5-inch round cathode-ray tube envelope. 0.67 gram of uncoated zinc-cadmium sulfide phosphor and 50 ml. of standard colloidal silica suspension are mixed with 9.3 ml. of 3.7 Normal ammonium hydroxide and sufficient water to form a phosphor slurry having a total volume of 75 ml. The phosphor slurry is spread over the surface of the solution contained in the envelope and permitted to settle on the faceplate of the tube. The total settling time is 15 minutes and the hydrogen ion concentration at pour-off is pH 7.3.

*Example 9*

When the process of Example 8 is repeated with only one-half the amount of standard colloidal silica suspension, the hydrogen ion concentration of the excess suspension at pour-off is reduced to pH7.1; in other respects the results obtained are substantially equivalent.

There may be relatively wide variations in the specific properties of the luminescent screens formed in accordance with the foregoing examples but in each case the adherence, the appearance of the screen and the tube life are fully satisfactory, with one or more of these characteristics exhibiting a marked improvement over prior art screens.

*Example 10*

7 ml. of 7.8 Normal phosphoric acid are diluted with water to a total volume of 425 ml. and introduced into a 5-inch round cathode-ray tube envelope. The phosphor slurry is formed by suspending 0.67 gram of either uncoated phosphor or 0.02% silica-coated phosphor in 50 ml. of the standard colloidal silica suspension; to this is added 5.6 ml. of 3.1 Normal potassium hydroxide and sufficient water to produce a slurry having a total volume of 75 ml. Settling is accomplished in the usual way in a total time of 15 minutes, and the hydrogen concentration at pour-off is pH 7.1.

*Example 11*

17.5 ml. of 1 Normal potassium nitrate and 3.5 ml. of 7.8 Normal phosphoric acid are diluted to a total volume of 425 ml. and introduced into a 5-inch round cathode-ray tube envelope. The phosphor slurry may be formed in the same manner specified in Example 10 and settling may also be achieved in the usual manner. The hydrogen ion concentration at pour-off is pH 7.

*Example 12*

9.6 ml. of 1.8 Normal potassium acetate and 3.5 ml. of 7.8 Normal phosphoric acid are diluted with water to a total volume of 425 ml. and introduced into a 5-inch round cathode-ray tube envelope. A satisfactory screen may be achieved by using the same slurry suspension as in Example 10, and the hydrogen ion concentration at pour-off is pH 6.5.

The screens formed in accordance with Examples 10–12 employ electrolytes selected from the second group, namely compounds having positive ions which though not fully volatilizable are fully compatible with the cathode and other components of the finished tube. In these examples of the present invention, there may be a potassium oxide or similar residue on the fluorescent screen as in the prior art silicate settling processes. Nevertheless, and in spite of the fact that the screens are virtually indistinguishable in response to ordinary chemical and physical analysis, it has been determined that a substantial improvement in screen adherence is achieved. The improvement is not as marked as in the case of processes employing the preferred accelerators of the first group, but a consistent improvement accompanied by a marked increase in the overall flexibility of the process is obtained.

Comparative analysis of the process of the present invention and the prevalent prior art processes indicates that there is a significant qualitative difference in the mechanism of screen settling. The significant difference may be summarized by stating that in the prior art processes such colloidal action as may be effected involves a continuous polymerization with an accompanying continuous decrease in the monomeric or soluble silica content of the processing liquid. In the process of the invention, however, introduction of the accelerator into the colloidal silica suspension results first in a partial depolymerization with an accompanying increase in the monomeric silica content, followed almost immediately by a marked repolymerization to a considerably lower soluble silica content.

More specifically, it is known that soluble silica reacts rapidly with ammonium molybdate to form a complex which exhibits an intense yellow color in an acid solution. Colloidal silica or silica polymers of higher molecular weights react much less rapidly with this reagent. Since its reaction rate depends on the size of the silica polymers, ammonium molybdate may be employed to conduct colorimetric tests to determine the relative monomeric silica and polymerized silica content of the settling liquid.

In actual tests conducted with several types of settling liquids the following results were obtained:

A simple solution of potassium silicate in water, upon reaction with a standard solution of ammonium molybdate for about three minutes resulted in an average light transmission of about 38%. This may be taken as an indication of a substantial soluble silica content.

The addition of barium nitrate as a gelling agent in accordance with a standard "gel settling" process, when tested under the same conditions, resulted in a light transmission of about 42%; consequently, it may be concluded that the addition of the barium nitrate results in a decrease in the amount of soluble silica in the settling liquid, or, stated in other terms, in a partial polymerization of the silica content. Prior art acid settling processes tested under the same conditions yielded an average light transmission of about 80%, showing a considerably greater polymerization than that achieved by the addition of barium nitrate. In both instances, the polymerization commenced almost immediately upon the addition of the gelling agent and progressed continuously as the solution was permitted to stand.

By way of comparison, the standard colloidal silica suspension described in the foregoing illustrative examples of the present invention, when reacted with ammonium molybdate under the same conditions, yielded an average light transmission of about 97%, showing that substantially no soluble silica is present in the standard colloidal silica suspension. When the asselerator is added, a definite increase in the amount of soluble silica during the initial stages of the reaction is noted as evidenced by a decrease in the light transmission reading to about 80% upon reaction with ammonium molybdate. With the further passage of time as successive samples are taken from the settling suspension, it is noted that the light transmission again increases to a final reading of about 84% after the standard settling time of 15 or 20 minutes, indicating a substantial repolymerization action. Thus the settling takes place at least partially through the repolymerized suspension. In no instance has the initial depolymerization and subsequent repolymerization characteristic of the present invention been observed in any settling process previously known in the art.

If desired, the preparation of the colloidal silica by ion exchange techniques may be integrated with the actual steps of the screen settling process. Although the colloidal silica suspension formed in the manner previously described may be stored for substantial periods of time without exhibiting excessive gelation, the optimum commercial advantage of the invention and maximum uniformity in the quality of the finished product in full scale commercial production may be achieved by further integrating the ion exchange and settling processes. Illustrative apparatus for accomplishing this is schematically illustrated in the accompanying drawing.

In Figure 1, an aqueous solution of 3 parts of water to 1 part of potassium silicate having 28% solids content and a 3.9 mol ratio of silica to potassium oxide is pumped or gravity-fed from a reservoir 10 through a valve 11 to tank 12 containing a bed of ion exchange medium such as sulfonated polystyrene. An outlet pipe 13 from ion exchange tank 12 is led through a valve 14 to a discharge tube 15 adapted to be inserted in the neck of a cathode-ray tube envelope 16 which is to be provided with a fluorescent screen. A reservoir 17 containing deionized or distilled water is also arranged to discharge into envelope 16 through a valve 18 and an outlet pipe 19. An additional reservoir 20 containing an accelerator such as ammonium acetate or a mixture of appropriate accelerating agents such as those set forth in the foregoing illustrative examples, a storage bin 21 for the phosphor powder, and water reservoir 17 are coupled through respective valves 22, 23 and 24 to a mixing chamber 25 where the phosphor slurry is formed. Mixing chamber 25 may be of the type described and claimed in Patent No. 2,650,199, issued August 25, 1953, to J. J. O'Callaghan for "Method of Mixing and Dispensing a Luminescent Coating Composition" and assigned to the present assignee, and may discharge through a valve 26 and an outlet pipe 27 also adapted to be inserted in the neck of envelope 17. Suitable automatic equipment for tilting the envelope 16 and carrying on other steps of the process and for conveying envelopes being processed from one station to another may be entirely conventional and accordingly have not been shown.

The operation of the apparatus of Figure 1 is readily apparent from the foregoing description of the invention. Valves 11, 14, 18, 22, 23, 24 and 26 may be either manually or automatically controlled in predetermined time sequence to introduce the constituents of the colloidal silica suspension into the envelope to serve as a settling medium. Integration of the ion exchange equipment 10—12 with the screen settling equipment insures that the colloidal silica is always freshly prepared as needed, thus avoiding any possibility of difficulty with excessive gelation or deterioration on prolonged standing.

In the preferred embodiment of Figure 2, the accelerator and deionized water are first introduced into envelope 16 through valves 22 and 18 respectively, and the colloidal silica is mixed with deionized water and the desired luminescent phosphor in mixing chamber 25 to form the phosphor slurry suspension. This suspension is introduced into envelope 16 through valve 26 after introduction of the accelerator. In other respects, the apparatus of Figure 2 is identical with that of Figure 1.

Thus the invention provides a new and improved process for forming a luminescent screen on a solid substrate such as the faceplate of a cathode-ray tube envelope. The process is characterized by all the desirable attributes of the prior art silicate settling processes but is strikingly less critical and therefore considerably more flexible for production use, particularly in the manufacture of tubes employing silica-coated cross-burn-resisting phosphors. Moreover, many of the attributes of the finished screen are demonstrably improved with respect to the results achieved by prior practices and, by employing electrolytes selected from the preferred group, the additional advantage of materially increased tube life may also be attained.

While particular embodiments of the present invention have been described, it is apparent that changes and modifications may be made without departing from the invention in its broader aspects. The aim of the appended claims, therefore, is to cover all such changes and modifications as fall within the true spirit and scope of the invention.

We claim:

1. A method of applying a luminescent screen to a solid support such as the faceplate of a cathode-ray tube envelope, which method comprises: settling a phosphor onto said support through a fluid column consisting essentially of a colloidal suspension of silicic acid and at least one accelerator in a neutral solvent; maintaining a residual portion of said fluid column in contact with said support for a substantial time interval after settling of said phosphor to cause said phosphor to adhere to said support; and thereafter removing said residual portion of said fluid column from said support.

2. A method of applying a luminescent screen to a solid support such as the faceplate of a cathode-ray tube envelope, which method comprises: settling a phosphor onto said support through a fluid column consisting essentially of colloidal suspension of silicic acid and at least one accelerator in a neutral solvent, all positive ions contained in said colloidal suspension being fully volatilizable; maintaining a residual portion of said fluid column in contact with said support for a substantial time interval after settling of said phosphor to cause said phosphor to adhere to said support; and thereafter removing said residual portion of said fluid column from said support.

3. A method of applying a luminescent screen to a solid support such as the faceplate of a cathode-ray tube envelope, which method comprises: settling a phosphor onto said support through a fluid column consisting essentially of a colloidal suspension, in a neutral solvent, of silicic acid and at least one organic salt electrolyte having only fully volatilizable positive ions; maintaining a residual portion of said fluid column in contact with said support for a substantial time interval after settling of said phosphor to cause said phosphor to adhere to said support; and thereafter removing said residual portion of said fluid column from said support.

4. A method of applying a luminescent screen to a solid support such as the faceplate of a cathode-ray tube envelope, which method comprises: settling a phosphor onto said support through a fluid column consisting essentially of a colloidal suspension, in a neutral solvent, of silicic acid and at least one inorganic salt electrolyte having only fully volatilizable positive ions; maintaining a residual portion of said fluid column in contact with said support for a substantial time interval after settling of said phosphor to cause said phosphor to adhere to said support; and thereafter removing said residual portion of said fluid column from said support.

5. A method of applying a luminescent screen to a solid support such as the faceplate of a cathode-ray tube envelope, which method comprises: settling a phosphor onto said support through a fluid column consisting essentially of an aqueous colloidal suspension of silicic acid and at least one inorganic salt electrolyte having only fully volatilizable positive ions; maintaining a residual portion of said fluid column in contact with said support for a substantial time interval after settling of said phosphor to cause said phosphor to adhere to said support; and thereafter removing said residual portion of said fluid column from said support.

6. The method of applying a luminescent screen to the faceplate surface of a cathode-ray tube envelope comprising the following steps: establishing said envelope in a settling position with said surface substantially horizontal; introducing into said envelope a suspension of phosphor material in a colloidal suspension formulated from water, colloidal silicic acid, and at least one accelerator as basic constituents; maintaining said envelope in said settling position for a substantial time interval to permit said phosphor material to settle through said colloidal suspension and adhere to said faceplate surface; and thereafter removing excess suspension from said envelope.

7. The method of applying a luminescent screen to the faceplate surface of a cathode-ray tube envelope comprising the following steps: establishing said envelope in a settling position with said surface substantially horizontal; introducing into said envelope an aqueous colloidal suspension of substantially pure silicic acid; adding to said solution a suspension of phosphor material in an aqueous solution of at least one electrolyte to accelerate polymerization of said colloidal silica suspension; maintaining said envelope in said settling position for a substantial time interval to permit said phosphor material to settle through said colloidal silica and adhere to said faceplate surface; and thereafter removing excess colloidal silica suspension from said envelope.

8. A method of applying a luminescent screen to the faceplate surface of a cathode-ray tube envelope comprising the following steps: establishing said envelope in a settling position with said surface substantially horizontal; introducing into said envelope an aqueous colloidal suspension of substantially pure silicic acid; adding to said solution a suspension of phosphor material in an aqueous solution of at least one electrolyte containing only fully volatilizable positive ions to accelerate polymerization of said colloidal silica suspension; maintaining said envelope in said settling position for a substantial time interval to permit said phosphor material to settle through said colloidal silica and adhere to said faceplate surface; and thereafter removing excess colloidal silica suspension from said envelope.

9. The method of applying a luminescent screen to the faceplate surface of a cathode-ray tube envelope comprising the following steps: establishing said envelope in a settling position with said surface substantially horizontal; introducing into said envelope a suspension of phosphor material in a colloidal suspension formulated from water, substantially pure silicic acid, and at least one accelerator as basic constituents; maintaining said envelope in said settling position for a substantial time interval to permit said phosphor material to settle through said colloidal suspension and adhere to said faceplate surface; and thereafter removing excess fluid from said envelope, said excess fluid having a hydrogen ion concentration in the range from pH 6 to pH 8.

10. The method of applying a luminescent screen to the faceplate surface of a cathode-ray tube envelope comprising the following steps: establishing said envelope in a settling position with said surface substantially horizontal; passing an aqueous solution of an alkali metal silicate through a bed of cation exchange resin to form colloidal silica; introducing into said envelope said colloidal silica, phosphor material, at least one accelerator, and a neutral solvent to form a colloidal suspension; maintaining said envelope in said settling position for a substantial time interval to permit said phosphor material to settle through said colloidal suspension and adhere to said faceplate surface; and thereafter removing excess fluid from said envelope.

11. The method of applying a luminescent screen to the faceplate surface of a cathode-ray tube envelope comprising the following steps: establishing said envelope in a settling position with said surface substantially horizontal; passing an aqueous solution of potassium silicate through a bed of sulfonated polystyrene to form colloidal silica; introducing into said envelope said colloidal silica, phosphor material, at least one accelerator, and a neutral solvent to form a colloidal suspension; maintaining said envelope in said settling position for a substantial time interval to permit said phosphor material to settle through said colloidal suspension and adhere to said faceplate surface; and thereafter removing excess fluid from said envelope.

12. The method of applying a luminescent screen to the faceplate surface of a cathode-ray tube envelope comprising the following steps: establishing said envelope in a settling position with said surface substantially horizontal; passing an aqueous solution of an alkali metal silicate through a bed of cation exchange resin to form colloidal silica; introducing into said envelope said colloidal silica and water; thereafter introducing into said envelope an aqueous solution of at least one accelerator containing only fully volatilizable positive ions to form a colloidal silica suspension; maintaining said envelope in said settling position for a substantial time interval to permit said phosphor material to settle through said colloidal suspension and adhere to said faceplate surface; and thereafter removing excess fluid from said envelope.

13. The process of applying a luminescent screen to the surface of a solid support such as a faceplate of a cathode-ray tube envelope, which method comprises: immersing said surface in a suspension of colloidal silica; at least partially depolymerizing said colloidal silica; subsequently repolymerizing said colloidal silica; settling a luminescent phosphor at least partially through said repolymerized colloidal silica suspension onto said surface; and removing the residuum of said suspension from contact with said surface.

14. The process of applying a luminescent screen to the surface of a solid support such as a faceplate of a cathode-ray tube envelope, which method comprises: immersing said surface in a suspension of colloidal silica; at least partially depolymerizing said colloidal silica in situ; subsequently repolymerizing said colloidal silica in situ; settling a luminescent phosphor at least partially through said repolymerized colloidal silica suspension onto said surface; and removing the residuum of said suspension from contact with said surface.

15. The process of applying a luminescent screen to the surface of a solid support such as a faceplate of a cathode-ray tube envelope, which method comprises: immersing said surface in a suspension of colloidal silica; at least partially depolymerizing said colloidal silica; subsequently repolymerizing said colloidal silica; settling a luminescent phosphor at least partially through said repolymerized colloidal silica suspension onto said surface; maintaining a residual portion of said suspension in contact with said surface for a substantial time interval after settling of said phosphor to cause said phosphor to adhere to said surface; and thereafter removing said residual portion of said suspension from contact with said surface.

16. The process of applying a luminescent screen to the surface of a solid support such as a faceplate of a cathode-ray tube envelope, which method comprises: immersing said surface in an aqueous suspension of colloidal silica; at least partially depolymerizing said colloidal silica; subsequently repolymerizing said colloidal silica; settling a luminescent phosphor at least partially through said repolymerized colloidal silica suspension onto said surface; maintaining a residual portion of said suspension in contact with said surface for a substantial time interval after settling of said phosphor to cause said phosphor to adhere to said surface; and thereafter removing said residual portion of said suspension from contact with said surface.

References Cited in the file of this patent

UNITED STATES PATENTS

| | | |
|---|---|---|
| 2,451,590 | Tidik et al. | Oct. 19, 1948 |
| 2,537,262 | Ellefson | Jan. 9, 1951 |
| 2,647,841 | Perl et al. | Aug. 4, 1953 |
| 2,678,888 | Evans | May 18, 1954 |